United States Patent [19]

Fagerburg et al.

[11] Patent Number: 5,021,546

[45] Date of Patent: *Jun. 4, 1991

[54] COPOLY(PHENYLENE SULFIDE)

[75] Inventors: David R. Fagerburg; Mark Rule; Joseph J. Watkins; Paul B. Lawrence, all of Kingsport, Tenn.

[73] Assignee: Eastman Kodak Company, Rochester, N.Y.

[*] Notice: The portion of the term of this patent subsequent to Dec. 20, 2005, has been disclaimed.

[21] Appl. No.: 536,049

[22] Filed: Jun. 11, 1990

Related U.S. Application Data

[63] Continuation of Ser. No. 324,063, Mar. 16, 1989, abandoned.

[51] Int. Cl.$^5$ ............................................. C08G 75/14
[52] U.S. Cl. ..................................... 528/389; 524/609
[58] Field of Search .............................. 528/388, 389

[56] References Cited

U.S. PATENT DOCUMENTS

| | | | |
|---|---|---|---|
| 3,878,176 | 4/1975 | Moberly . | |
| 3,919,177 | 11/1975 | Campbell | 528/388 |
| 4,451,640 | 5/1984 | Shiiki et al. | 528/388 |
| 4,605,732 | 8/1986 | Heitz et al. | 528/328 |
| 4,648,415 | 10/1987 | Sinclair et al. | 528/388 |
| 4,748,169 | 5/1988 | Izutsu et al. | 525/537 |
| 4,786,713 | 11/1988 | Rule et al. | 528/389 |
| 4,792,600 | 12/1988 | Rule et al. | 528/389 |
| 4,826,956 | 5/1989 | Fagerburg et al. | 528/389 |
| 4,840,986 | 6/1989 | Inoue et al. | 528/328 |
| 4,857,629 | 8/1989 | Rule et al. | 528/389 |
| 4,859,762 | 8/1989 | Rule et al. | 528/389 |

OTHER PUBLICATIONS

Derwent Publication, #87-038923/06 for Japanese Patent J6 1293-225-A.
Derwent Publication, #86-302703/46 for Japanese Patent J6 1225-218-A.
Derwent Publication, #86-314224/48 for Japanese Patent J6 1231-030-A.

*Primary Examiner*—John C. Bleutge
*Assistant Examiner*—David W. Woodward
*Attorney, Agent, or Firm*—Charles R. Martin; William P. Heath, Jr.

[57] ABSTRACT

A process for producing elemental iodine and a copoly(arylene sulfide) corresponding to the structure

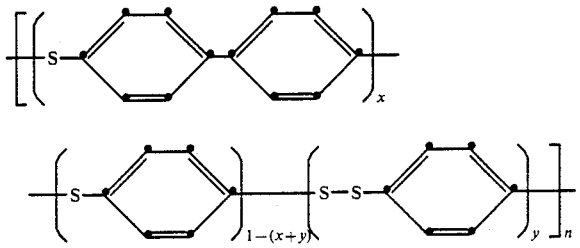

wherein y is in the range of 0.001 to 0.15, x is in the range of 0.02 to 0.65 and n is at least 100, consisting essentially of (1) reacting at a temperature above about 175° C., a mixture of diiodobenzene and diiodobiphenyl and elemental sulfur to produce the copoly(arylene sulfide), and (2) recovering the elemental iodine.

5 Claims, No Drawings

COPOLY(PHENYLENE SULFIDE)

This is a continuation of application Ser. No. 07/324,063 filed on Mar. 16, 1989, now abandoned.

The invention relates to a copoly(phenylene sulfide) containing biphenyl units in the chain.

Copolymers of poly(phenylene sulfide) and other aromatic radicals are known in the art. Japanese Patent J6 1231-030 A discloses copolymers of PPS with 1 to 5 mol% of biphenylene or triphenylene units. Japanese Patent J6 1225-218-A disclosed a copolymer with sulfone groups which is said to be a block copolymer. Japanese Patent J6 1293-225-A discloses poly(phenylene sulfide) containing biphenyl units.

Copoly(phenylene sulfide) polymers prepared by heating a diiodoaromatic compound in the presence of elemental sulphur have been recently discovered and are disclosed in Serial Number 117,722. These polymers can be described as corresponding to the structure

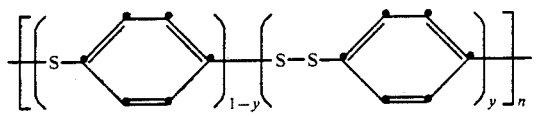

where y is in the range of 0.5 to 0.001.

We have now discovered that small amounts of biphenyl can be incorporated into this polymer to produce a polymer which exhibits an unexpected combination of high heat distortion temperature and polymer toughness. These copolymers also exhibit an unusual combination of higher melt viscosity and higher melt fluidity compared to a poly(phenylene sulfide disulfide) polymer.

Thus the polymer of this invention can be described as having repeating units corresponding to the structure

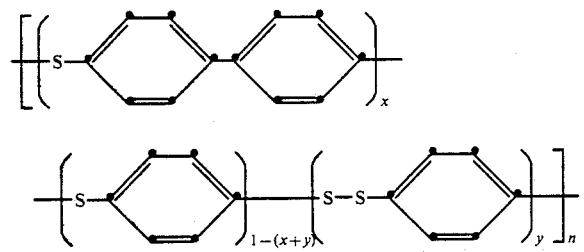

wherein y is in the range of 0.001 to 0.15, preferably 0.001 to 0.10, x is in the range of 0.02 to 0.65, preferably 0.04 to 0.60 and n is at least 100, preferably at least 200.

In both of the above structures, the repeating units having disulfide linkages are defined as corresponding to the excess atoms of sulfur per aromatic ring unit as determined by an appropriate analytical method, such as elemental analysis.

The copoly(phenylene sulfide) of this invention is prepared by reacting diiodobiphenyl, diiodobenzene and sulfur in the same manner as disclosed in Serial No. 117,722, now U.S. Pat. No. 4,786,713 herein incorporated by reference. The biphenyl units are incorporated into the polymer by using diiodobiphenyl as a comonomer along with diiodobenzene and sulfur.

The diiodoaromatic starting materials of the present invention may be prepared by methods well known in the art, such as liquid- or gas-phase iodination reactions.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6-12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%-100%, although sulfur having a lower degree of purity may be used. This lack of sensitivity to the presence of impurities in the sulfur is advantageous to the present process when used as a commercial process since highly purified sulfur is not required and the associated expense is not incurred.

In the process used to prepare the polymer of this invention sulfur reacts with both diiodobenzene and diiodobiphenyl eliminating elemental iodine and forming the polymer.

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of sulfur result in decreasing levels of disulfide linkages in the final polymer. When the diiodoaromatic compound is present in excess, polymerization to high polymer can still occur, if the excess diiodoaromatic compound is removed during final polymerization. Thus, excess diiodoaromatic compound in this case is the diiodobenzene.

The polymerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction. Catalysis of the reaction may be accomplished by inclusion of nitro aromatic compounds as disclosed in U.S. Pat. No. 4,792,600, amino aromatic compounds as disclosed in Ser. No. 220,404, or iron and/or its compounds as disclosed in Ser. No. 246,902.

In another embodiment, the diiodobiphenyl and diiodoaromatic compound can be dissolved in an organic solvent which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene and diiodobiphenyl with sulfur, one might use benzene, toluene or naphthalene as a solvent.

A significant aspect of this invention is the absence of cross linking during the melt polymerization processes. The polymers of this invention are substantially linear and have excellent film forming properties.

During the polymerization reaction between the diiodobenzene, diiodobiphenyl and sulfur, elemental iodine is produced and evolves from the reaction melt or solution. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. Particularly advantageous is the use of a sweep of oxygen containing gas as disclosed in Ser. No. 119,711. The elemental iodine may be collected and used as a commercial product or as a reactant for further chemical processes. The present reaction, therefore, does not result in wasted reaction products since both the PAS and elemental iodine are useful commercial chemical products.

The final phase of the polymerization reaction is generally conducted at a temperature above about 350° C. There is no particular upper temperature limit on the polymerization reaction, which may be conducted at any temperature below the decomposition temperature of the diiodoaromatic compound. For most polymerization reactions, temperatures in the range of about 350°-400° C. will be suitable, although for particular diiodoaromatic compounds temperatures in excess of 400° C. may be used. Particularly preferred temperature ranges are from about 350°-375° C.

The final phase of the reaction is generally conducted for a period of one half hour or less but can be continued for longer times. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semi continuous or continuous process. Agitation of the reaction mixture is optional, however, agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compounds and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

In this reaction, it is also advantageous to perform the polymerization in the presence of a sweep of oxygen containing gas as disclosed in Ser. No. 196,711.

Additionally, for certain applications, termination of the copolymer may be desirable for control of the molecular weight and melt stability as disclosed in Ser. No. 219,123.

The useful range of biphenyl units according to this invention for preparation of molded articles ranges from about 2 to about 65 mol % with the preferred range being from about 4 to 60 mol %. In this range, the copolymers exhibits an unexpected combination of high heat distortion temperature and polymer toughness.

The polymer of this invention is useful for preparation of various shaped articles such as pellets, films and molded articles. The polymer can be prepared into these shaped articles by conventional processes, such as injection molding, and melt extrusion.

The copolymers of this invention can be optionally mixed with inorganic fillers such as fiber8lass, mica, talc, wollastonite, etc. or combinations thereof to yield molded articles having a higher modulus and heat distortion temperature than without the filler. Permissible levels of these fillers range from 5 to about 50 weight % based on the total compounded weight of polymer plus filler. Fiberglass is a particularly preferred filler and can be obtained in many grades commercially. One particularly advantageous fiberglass grade is grade 497-DB fiberglass from Owens Corning Company. Compounding of the inorganic filler can be accomplished in any convenient manner such as extrusion of a physical blend of the filler and the polymer granules Alternatively, the compounding may be done as the polymer is being prepared in the melt.

EXAMPLES

EXAMPLE 1

This example illustrates the preparation of a polymer of this invention.

Into a 500 ml 3-neck round bottom flask are weighed the following: 32 g sulfur (0.998 mol), 246 g diiodobenzene (0.75 mol, 20 mol % excess overall, 23.8 mol % excess of this compound), 162.3 g 4,4-diiodobiphenyl (0.40 mol, 40 mol % copolymer units), and 0.8 g of 1,3-diiodo-5-nitrobenzene. The flask was fitted with a 350 mm long Vigreux column, a mechanical stirrer through the center joint, and an inlet tube for a slow air sweep (sweep rate 0.1 ft$^3$/hr). The column was attached via a distillation head and a takeoff tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 30 min and then reduced to 60 torr where it was held for an additional 30 min. The bath temperature was then increased to 250° C., the pressure reduced to 0.3 torr and the melt condensed for 1 hr. The bath temperature was raised to 300° C. and after 21 min the bath was raised to 350° C. and held there for 29 min. The reaction flask was removed from the metal bath, repressurized with nitrogen, and allowed to cool under nitrogen. The polymer yield was determined by weighing the flask assembly after the reaction and subtracting that weight from the total weight of the assembly plus reactants prior to the start of the reaction. The yield was 98.6% of polymer with a very high melt viscosity which remained amorphous upon cooling. The Tg (by DSC) was 150° C. The polymer was very tough. Melt viscosity was measured at 375° C. on a Rheometrics Mechanical Spectrometer at 25 radians/sec The melt viscosity was 138,400 poise with a fluidity (the square of the ratio of the loss modulus, G'', to the storage modulus, G') of 1.64.

EXAMPLE 2

This example illustrates the preparation of another polymer of this invention.

The preparation of Example 1 was repeated but using a different ratio of the two dioodoaromatic monomers. p-Diiodobenzene, 328 g (0.99 mol) and 81.2 g 4,4'-diiodobiphenyl (0.20 mol, 20 mol % copolymer units) were employed in the preparation of the copolymer. The same heating and pressure schedule were employed as in Example 1 except that the bath temperature was raised from 250° C. directly to 350° C. and held there for 30 min. polymer yield was 98.9% and the polymer was observed to be amorphous upon cooling. The Tg (by DSC) was 125° C. and the polymer was tough. Melt viscosity at 375° C. was 344,800 poise with a fluidity of 0.50.

EXAMPLE 3

This example illustrates the preparation of another polymer of this invention.

The preparation of Example 1 was repeated but using a different ratio of the two dioodoaromatic monomers. p-Diiodozenzene, 389.5 g (1.18 mol) and 20.3 g 4,4'-diiodobiphenyl (0.05 mol, 5 mol % copolymer units) were employed in the preparation of the copolymer. The same heating and pressure schedule were employed as in Example 1 except that the bath temperature was raised from 250° C. directly to 350° C. and held there for 30 min. polymer yield was 100.1% and the polymer was observed to be amorphous upon cooling. The Tg (by DSC) was 106° C. and the polymer was tough. Melt viscosity at 375° C. was 170,400 poise with a fluidity of 0.92.

EXAMPLE 4

This example illustrates the preparation of another polymer of this invention.

The preparation of Example 1 was repeated but using a different ratio of the two dioodoaromatic monomers. p-Diiodobenzene, 369 g (1.12 mol) and 40.6 g 4,4'-diiodobiphenyl (0.10 mol, 10 mol % copolymer units) were employed in the preparation of the copolymer. The same heating an pressure schedule were employed as in Example 1 except that the bath temperature was raised from 250° C. directly to 350° C. and held there for 30 min. The polymer was observed to be amorphous upon cooling. The Tg (by DSC) was 110° C. and the polymer was tough. Melt viscosity at 375° C. was 347,000 poise with a fluidity of 0.17.

EXAMPLE 5

This example illustrates the preparation of another polymer of this invention.

The preparation of Example 1 was repeated but using a different ratio of the two dioodoaromatic monomers. p-Diiodobenzene, 16% g (0.50 mol) and 243.5 g 4,4'-diiodobiphenyl (0.60 mol, 60 mol % copolymer units) were employed in the preparation of the copolymer. The same heating and pressure schedule employed was 2 hr at 230° C. and 200 torr pressure, followed by 2 hr at 240° C. and the same pressure. The bath temperature was then raised to 350° C. and the pressure reduced to 120 torr. After ~25 min the bath had reached the set point and the pressure was further reduced to 60 torr for 3 min. The polymer was cooled under nitrogen, granulated, and placed in a glass tube in an aluminum block at 240° C. under a nitrogen flow of 1.0 ft³/hr. After 1.5 hr the block was raised to 275° C. and held there 17.5 hr. at which time it was raised to 300° C. After 8 hr, the tube was removed from the block and a tough film pressed at 400° C.

EXAMPLE 6

This example illustrates the superior toughness and heat distortion temperature of a polymer of this invention.

Several preparations of the copolymer of Example 4 were blended together as granules and injection molded on a Watson-Stillman molding machine using a barrel temperature of 370° C. into a room temperature mold. The physical properties were determined as follows:

| | |
|---|---|
| Tensile brk, psi | 7550 |
| Elongation, yield, % | 4 |
| break, % | 8 |
| Izod impact | |
| notched, ft-lb/in | 1.2 (23° C.) |
| unnotched, ft-lb | 37.9 (23° C.) |
| Heat distortion temp | |
| 66 psi stress, °C. | 105 |
| 264 psi stress, °C. | 93 |

EXAMPLE 7

This example also illustrates the superior toughness and heat distortion temperature of a polymer of this invention.

Several preparations of the polymer of Example 2 were blended together as granules and injection molded on a Watson Stillman molding machine using a barrel temperature of 380° C. into a room temperature mold. The physical properties were determined as follows:

| | |
|---|---|
| Tensile brk, psi | 8690 |
| Elongation, yield, % | 4 |
| break, % | 6 |
| Izod impact | |
| notched, ft-lb/in | 1.23 (23° C.) |
| unnotched, ft-lb | 6.7/30.4 (20% CB/80% PB, 23° C.) |
| Heat distortion temp | |
| 66 psi stress, °C. | 112 |
| 264 psi stress, °C. | 100 |

Note: for Izod values CB = complete break and PB = partial break.

We claim:
1. A process for producing elemental iodine and a copoly(arylene sulfide) corresponding to the structure

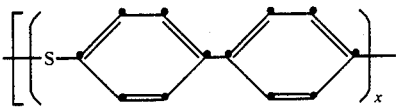

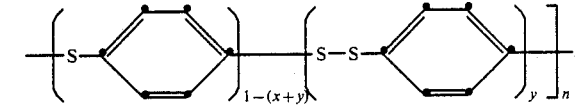

wherein y is in the range of 0.001 to 0.15, x is in the range of 0.02 to 0.65 and n is at least 100, consisting essentially of
  (1) reacting at a temperature above about 175° C., a mixture of diiodobenzene and diiodobiphenyl and elemental sulfur to produce the elemental iodine and the copoly(arylene sulfide), and
  (2) recovering the elemental iodine.
2. The process of claim 1 wherein x is in the range of 0.04 to 0.60.
3. The process of claim 1 wherein y is in the range of 0.001 to 0.10.
4. The process of claim 1 wherein n is at least 200.
5. The process of claim 1 wherein y is in the range of 0.001 to 0.10, x is in the range of 0.04 to 0.60 and n is at least 200.

* * * * *